Feb. 27, 1962 G. B. HORTON ETAL 3,022,975
SEAT ADJUSTER
Filed Feb. 15, 1960 3 Sheets-Sheet 2
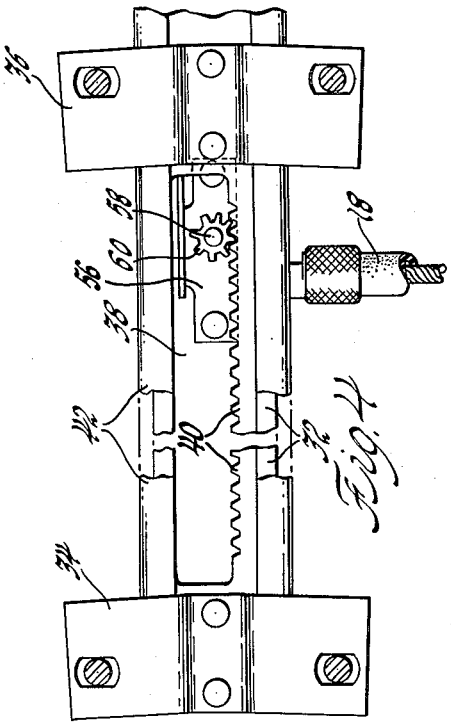
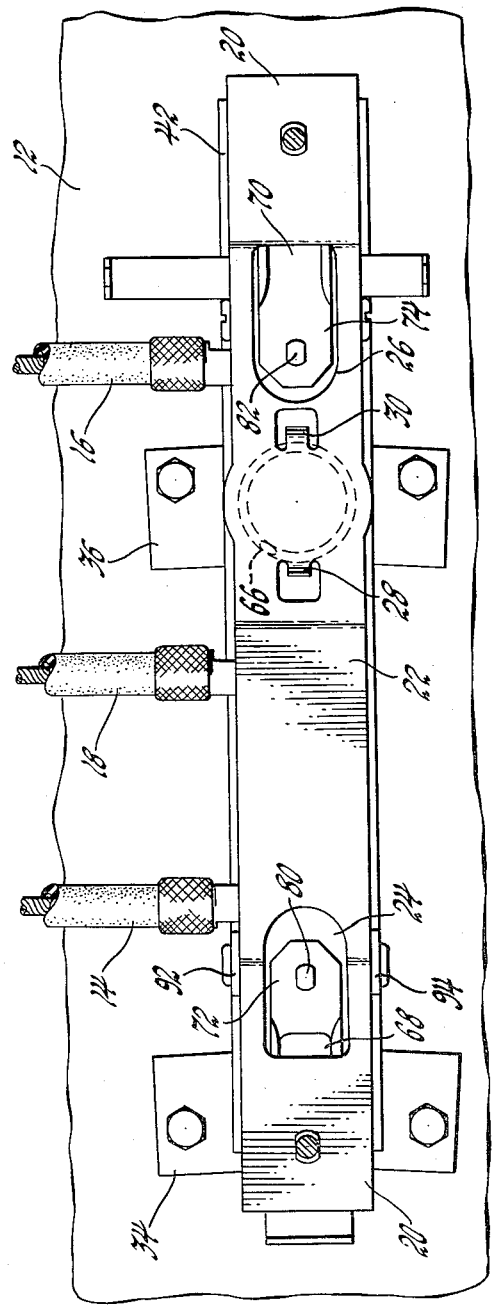
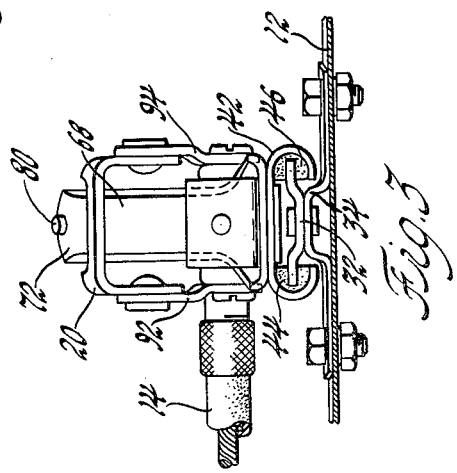
INVENTORS
George B. Horton
BY & Thomas E. Lohr
R. P. Barnard
ATTORNEY Feb. 27, 1962     G. B. HORTON ETAL     3,022,975
SEAT ADJUSTER Filed Feb. 15, 1960     3 Sheets-Sheet 3

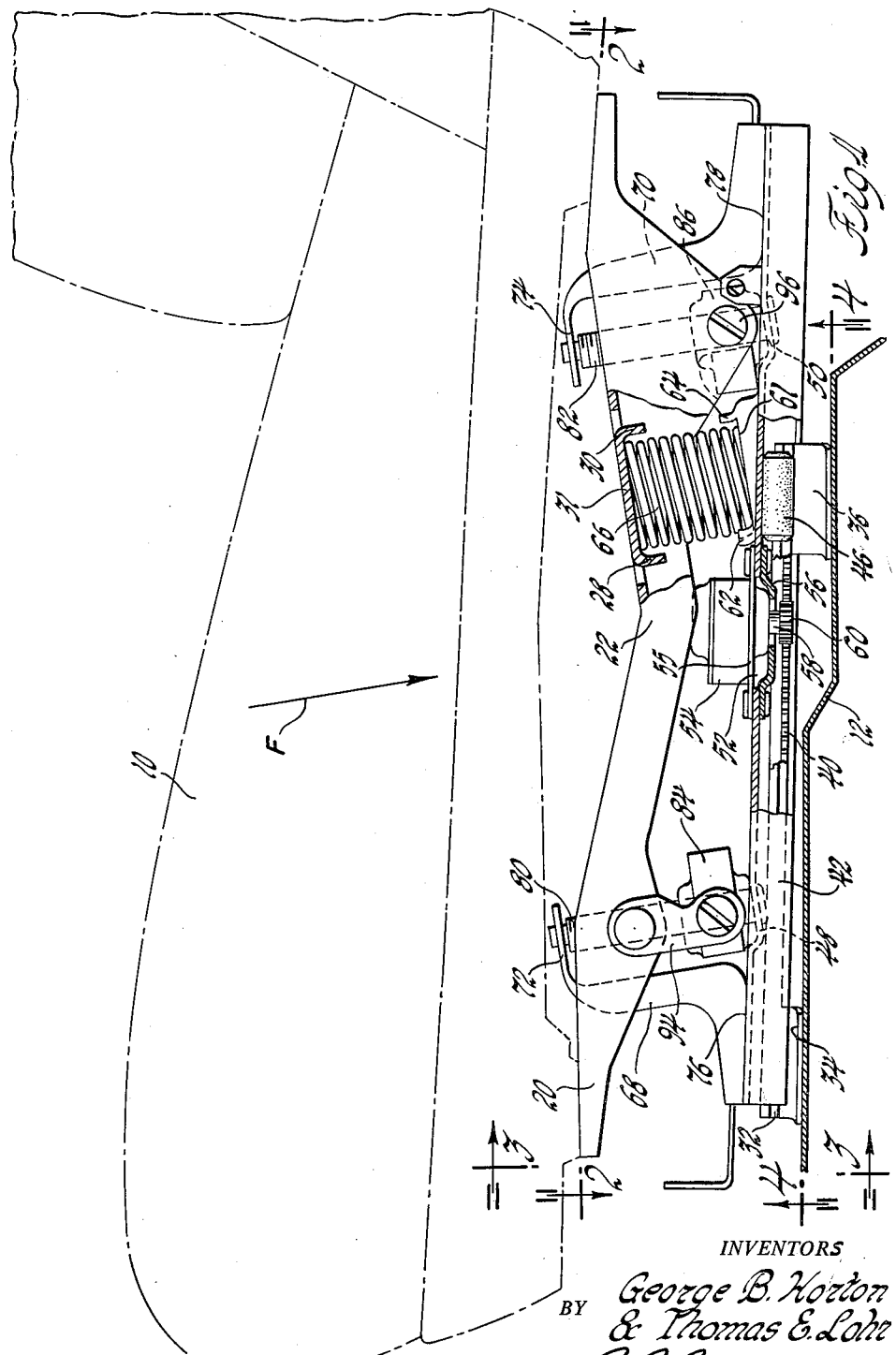

INVENTORS
George B. Horton
& Thomas E. Lohr
BY
L. P. Barnard
ATTORNEY

United States Patent Office 3,022,975
Patented Feb. 27, 1962

3,022,975
SEAT ADJUSTER
George B. Horton, Dearborn, and Thomas E. Lohr, Redford, Mich., assignors to General Motors Corporation, Detroit, Mich., a corporation of Delaware
Filed Feb. 15, 1960, Ser. No. 8,751
15 Claims. (Cl. 248—420)

This invention relates to a seat adjuster and more specifically to power operated seat adjusting mechanism.

As power seat adjusting mechanism has come to be more widely used in the automobile industry, a variety of power adjusting mechanisms, including complicated and intricate actuating linkages, have been devised to permit movement of a vehicle seat in a plurality of directions. The more recent developments have been directed to seats which are horizontally adjustable, vertically adjustable as a unit and separately vertically adjustable at the front and rear of the seat members. We have found that the most satisfactory service can be obtained from mechanism which employs a minimum of operating parts and that a more economical version of power seat adjusting mechanism can be obtained by concentrating quality manufacturing into a few key elements of the mechanism. In order to determine the characteristics required for particular parts and to determine the optimum location of particular parts in relation to their cooperatively associated members, we have determined the angle of inclination relative to a horizontal plane representing, for example, a vehicle floorboard, and the location of the line of action of the maximum force to which the seat adjuster mechanism is normally subjected.

In accordance with this determination it is an object of this invention to provide seat adjusting mechanism which is constructed and arranged in a manner to optimumly withstand normal applications of force. Another object of this invention is to simplify existing seat adjusting mechanism so that a minimum of coacting parts are required. A further object of this invention is to construct and arrange a minimum number of parts in a manner best facilitating long wear of the parts subjected to repeated load stress. Another object of this invention is to reduce the number of power transferring links disposed between a power input source and linkage actuating mechanism for seat adjustment. Another object of this invention is to provide seat adjusting mechanism which is compactly arranged to economically utilize the limited space provided between a vehicle seat and a vehicle floorpan. Still another object of this invention is to integrate seat adjustment drive mechanism with parts providing for relative movement of the seat to the seat support. An additional object of this invention is to provide specially constructed force opposing mechanism optimumly arranged and disposed to facilitate maximum response of the seat adjusting mechanism to power application thereto.

The foregoing objects are accomplished by providing seat adjusting mechanism comprising individual seat support means which are angularly disposed relative to the seat and in substantially parallel alignment with the line of maximum force applied to the seat support mechanism by the accommodation of different masses on the seat member. In addition, power operated means are provided that are directly, cooperatively associated with inclined support members to control vertical movement of a vehicle seat. Spring means are provided to offset the downward bias created by loading of the vehicle seat and to assist in vertical upward movement thereof. In addition, a more compact and sturdy horizontal movement mechanism is provided including drive means integrally associated with slide means permitting horizontal movement of the seat member.

Other objects and advantages of the present invention will be revealed in the following detail description in which reference is made to the accompanying drawings wherein:

FIGURE 1 is a side elevational view, partly in section, of the preferred embodiment of our invention;

FIGURE 2 is a plan view of the seat adjusting mechanism taken along the line 2—2 in FIGURE 1;

FIGURE 3 is an end view of the apparatus taken along the line 3—3 in FIGURE 1;

FIGURE 4 is a bottom view taken along the line 4—4 in FIGURE 1;

Figure 5:
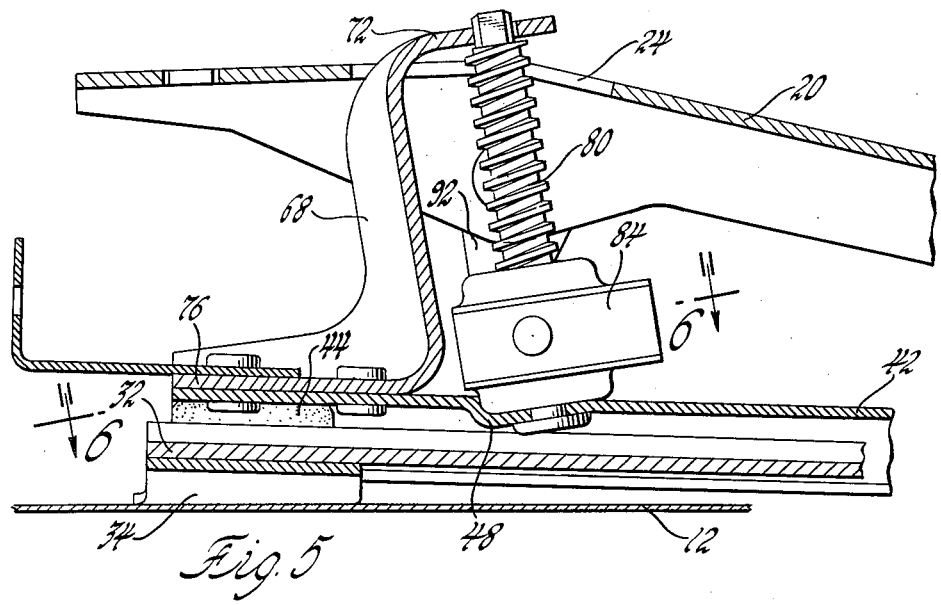
FIGURE 5 is a partial, sectional view of a portion of the apparatus shown in FIGURE 1.

Referring to the drawings, a front seat 10 of a vehicle is mounted on a section of the vehicle floor 12 by parallelly spaced similar seat adjusters. Since the seat adjusters are nearly identical, only one is shown and described in detail. The seat adjusters are powered in a conventional manner by a reversible electric motor (not shown) provided with control switches for the vehicle operator. The motor drives front and rear elevation controlling flexible cables 14, 16 and a horizontal adjustment controlling flexible cable 18, illustrated in FIGURE 2, through a conventional clutching mechanism (not shown). It is to be understood that a similar set of flexible cables are provided for each seat adjuster.

Referring now to FIGURE 1, the seat member 10 is shown directly supported by a U-shaped frame member 20 which comprises a downwardly extending center section 22 and slots 24, 26 as shown in FIGURE 2. A portion of the center section is provided with downwardly extending tangs 28, 30 that provide a spring seat 31. A trackway for horizontal adjustment is provided and comprises a track member 32 fixedly supported by brackets 34, 36 to the vehicle floor 12. The track member 32 has a centrally located longitudinal slot 38 which is provided with an integrally formed rack 40 along one edge thereof as shown in FIGURE 4. An upper track 42 having a C-section is mounted on the lower track 32 by sets of plastic bearing shoes 44, 46, illustrated in FIGURE 3, and is provided with spaced depressions 48, 50 along the upper surface thereof. It is to be noted that the depressions provided parallelly inclined support surfaces and have suitable fastening holes. An access hole 52 is also provided on the upper surface of the track member 42 and accommodates a drive unit 54 mounted within the hole 52 by plates 55, 56 secured to the track member 42. A drive shaft 58 is driven by a worm gear and cable driven worm (not shown) within the unit 54 and extends downwardly from the drive unit and drivingly supports a pinion 60 in driving engagement with the rack 40. An inclined boss 61 is formed on the top of the track member 42 and, together with upwardly struck tangs 62, 64, forms a spring seat that accommodates a compression spring 66. S-shaped brackets 68, 70 having parallel top and bottom surfaces 72, 74 and 76, 78 are fixed to the top of the track member 42 adjacent the ends thereof and extend upwardly through the slots 24, 26 in the frame member 20. It is to be noted that the top surfaces 72, 74 of the brackets 68, 70 are parallel to the inclined boss 61, the compression spring seat section 31 of the frame member 20 and the depressions 48, 50.

Figure 6:
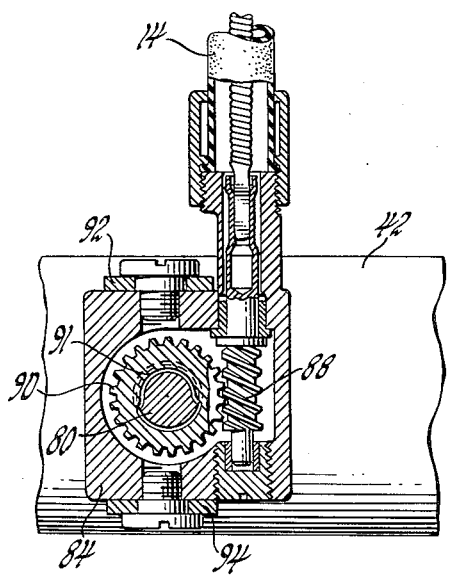
FIGURE 6 is a detailed view taken along the line 6—6 in FIGURE 5.

Threaded lead screw support members 80, 82 are non-rotatably fixed between the brackets 68, 70 and the track member 42 on the parallelly inclined top surfaces 48, 50, 72, 74 thereof. Mechanical movement devices 84, 86 are mounted on the lead screw members 80, 82 and comprise a cable driven worm 88 and an integral rotatable worm gear nut 90 as shown in FIGURE 6. The details of this unit are more fully described in United States Patent No. 2,905,012. Pivotal links 92, 94 connect the unit 84 with the seat frame member 20 and a pivotal connection 96 links the unit 86 thereto so that the lead screws 80, 82 serve as support posts for the seat 10. The angle of inclination of the parallel support post lead screws 80, 82 and the compression spring 66 is determined by theoretical location of the line of force F representing the most common direction of application of the maximum forces due to seat loading. In order to minimize wear and facilitate vertical seat adjustment, the support post lead screws 80, 82 are parallelly positioned relative to the line of force F.

In operation, the seat 10 may be adjusted horizontally by manipulation of suitable control mechanism that actuates the power source and clutch mechanism to drive the flexible cable 18 and the pinion 60. The coaction of the pinion 60 on the rack 40 drives the upper channel 42 and, consequently, the seat 10 fore and aft relative to the bottom channel 32 which is fixed to the floor 12. The provision of a rack member 40 integrally formed along one edge of an internal slot 38 formed in the lower track member 32 permits an extremely compact association between the horizontal drive means and the track members since the drive mechanism 54 is rigidly supported by a simple fastening device; that is, the only fastening means provided between the horizontal drive mechanism and the channel members 32, 42 is the fastening means which secure the worm drive housing 54 to the upper channel 42. Suitable control mechanism also permits individual or simultaneous actuation of the movable units 84, 86 upwardly or downwardly on the threaded support posts 80, 82 so that the seat may be uniformly elevated or the front or back of the seat may be individually elevated by actuation of either the worm gear nut 90 of the front unit 84 or the worm gear nut of the rear unit 86. For example, actuation of the power cable 14 drives the worm 88 and the worm gear nut 90 upwardly or downwardly by coaction of internal threads 91 of the worm gear nut 90 with the threads on the support post 80. Vertical movement of the unit 84 is thereby obtained, and the seat support frame 20 is vertically raised or lowered by power transfer through the front pivotal links 92, 94. Actuation of the rear unit 86 upwardly and downwardly on the threaded support shaft 82 causes direct movement of the seat support member 20 through the pivotal connection 96. All of the operating mechanism is conventionally reversible to permit reverse movement of the seat. When the seat is being elevated, the compression spring 66 exerts a biasing force upwardly parallel to the line of force F to assist in raising the seat and to help counteract the downward force caused by loading of the seat 10. By providing a seat support frame 20 that has a centrally inclined surface, the biasing action of the compression spring 66 may be directed parallel to the line of force created by loading of the seat. In addition, by inclining the upper portions 72, 74 of the S-shaped flanges 68, 70 so that they extend normal to the line of force F of the loaded seat, the support posts 80, 82 can be parallelly supported relative to the line of force to obviate any binding action which a non-parallel force application would tend to create. It will be obvious that the aforedescribed apparatus greatly improves existing seat structure as to compactness and reduction in total number of operating parts in that the basic operating mechanism for vertical adjustment of the whole seat comprises a minimum of four inclined jack screw support posts and a jack nut unit for each of the posts that is drivingly engaged with a seat support frame to raise and lower the seat. In addition, the horizontal drive mechanism is greatly improved over previous apparatus in that a rack member is integrally formed within a slot in one of the channel members and a pinion drive housing may be closely associated therewith to cooperatively, drivingly engage a pinion with the rack portion.

Having thus described our invention, it should be apparent that the scope of the appended claims comprehends various changes in the details of construction and arrangement of the parts of the aforedescribed mechanism within the spirit of the invention.

We claim:

1. Seat adjuster mechanism comprising upper spaced seat support members, threaded post members supporting said seat support members, said post members being parallelly positioned relative to a line representing the normal maximum force applied to the seat support members when the seat is loaded, post supporting brackets having surfaces transverse to said line of force, lower support means for said brackets, a surface on said lower support means being transverse to said line of force and parallel to said transverse surfaces of said post supporting brackets, said support posts being rigidly fixed between said parallel surfaces of said post support brackets and said lower support means, jack nut means rotatably mounted on said post means, power transfer connections between said post members and said upper seat support members, and means to drive said nut members upwardly and downwardly on said post members to vertically position the upper seat support members.

2. In a seat adjuster having spaced seat adjusting mechanisms, each mechanism comprising a seat support member, a lower channel member fixedly supported thereunder, a central slot in said lower channel, rack means integrally formed along an edge of said slot, an upper channel slidably disposed on said lower channel, a gear mechanism fixed to the upper surface of said upper channel, a portion of said gear mechanism extending through said upper channel and drivingly associated with said rack, means linking means interconnecting said upper channel and said seat support member, and power means to actuate said gear mechanism and move said upper channel relative to said lower channel to variably position the seat.

3. A seat adjuster device comprising a base member, track means supporting said base member for fore and aft adjustment, a seat support member of channel cross section comprising spaced downwardly extending side portions connected by a web portion, front and rear support posts fixed to said base member and extending upwardly therefrom between said side portions of said seat support member and in alignment with openings provided in said web portion for movement therethrough, front and rear screw jack means extending upwardly between said base member and said seat support member, each jack screw means being fixably secured at one end to said base member and at the other end to the upper extremity of the adjacent corresponding support post, vertically displaceable nut means supported on each of said screw jack means for longitudinal movement thereon, means pivotally connecting each of said nut means to adjacent portion of said side portions of said seat support member, and actuating means to effect independent movement of said nut means on said screw jack means to independently vertically displace the front and rear of said seat support member.

4. The device as defined in claim 3 and wherein said screw jack means are forwardly inclined at an angle parallelly corresponding to a predetermined average angle of force application to the seat adjuster device by occupants of a seat carried by said seat support member, and said angle being greater than 45° and less than 90°.

5. The seat adjuster device as defined in claim 3 and wherein said means pivotally connecting each of said nut means to adjacent portions of said side portions of said seat support member comprise pivot means directly connecting one of said nut means to said seat support member between said side portions thereof, a link pivotally connected to the other of said nut means, and said link being pivotally connected to said seat support member.

6. The seat adjuster device as defined in claim 4 and wherein said support posts each comprise a lower flange portion fixably secured to said base member, an upwardly extending portion parallelly inclined relative to said screw jack means, and an upper flange portion extending transversely to said upwardly extending portion and to said screw jack means connected thereto.

7. The seat adjuster device as defined in claim 4 and having spring assist means for effecting upward vertical displacement of said seat support member, and spring seat means formed on said seat support member and said base member to locate and position said spring assist means so that assist forces exerted by said spring assist means are parallel to the angle of inclination of said jack screw means.

8. In a seat adjuster having spaced seat adjusting mechanisms, each mechanism comprising a seat support member, a lower channel member fixably supported thereunder, a central slot in said lower channel, rack means integrally formed along one edge of said slot, an upper channel slidably disposed on said lower channel, a gear mechanism fixed to the upper surface of said upper channel and being located between said upper channel and said seat support member, a portion of said gear mechanism extending through said upper channel and being drivingly associated with said rack means, linking means interconnecting said upper channel and said seat support member to effect vertical adjustment of said seat support member from an uppermost position whereat all portions of said seat support member are located above said gear mechanism to a lowermost position whereat portions of said seat support member are located in the same horizontal plane as said gear mechanism, said gear mechanism being centrally located relative to said seat support member and nestable therewithin to permit vertical movement of portions of said seat support member to positions in the same horizontal plane as said gear mechanism, and power means to actuate said gear mechanism and move said upper channel relative to said lower channel for fore and aft adjustment.

9. A seat adjuster device comprising a base member, spaced vertically extending support posts mounted on said base member, a seat support member having a downwardly opening channel cross section comprising an upper web and spaced downwardly extending side flanges, front and rear jack screw means each fixably mounted at one end to said base member adjacent one of said support posts and extending vertically therefrom at an angle greater than 45° and less than 90° and fixably mounted at the other end thereof to said one of said support posts, movable nut assemblies mounted on each of said screw jack means for longitudinal movement therealong, power means to reversely actuate each of said nut assemblies to effect upward or downward movement thereof on said screw jack means, said screw jack means and said movable nut assemblies and said support posts being vertically located within the confines of said side flanges of said seat support members, portions of said web of said seat support member above said jack screw means being apertured to permit said seat support member to be moved vertically above and below the upper ends of said jack screw means and said support posts, pivotal means directly connecting one of said movable nut assemblies to the adjacent side flanges of said seat support member, and link means pivotally connected to the other of said movable nut assemblies and pivotally connected to the adjacent side flanges of said seat support member to effect independent vertical adjustment thereof.

10. The adjuster device as defined in claim 9 and having spring assist means for assisting upward vertical displacement of said seat support member, and spring seat means formed on said seat support member and said base member to direct assist forces exerted by said spring assist means parallel to the angle of inclination of said jack screw means.

11. The seat adjuster device as defined in claim 9 and wherein said support posts comprise a lower flange portion fixably secured to said base member, an upwardly extending portion inclined parallelly to said jack screw means, and an upper flange portion extending at substantially right angles to said upwardly extending portion, and said jack screw means being fixably supported by said upper flange portion and extending at substantially right angles thereto.

12. A seat adjuster unit comprising a seat support member, a lower channel member fixably supported below said seat support member, an upper channel member slidably disposed on said lower channel member for fore and aft adjustment, said lower channel member and said upper channel member and said seat support member being aligned one above the other in a vertically stacked relationship, vertical seat adjustment means in the form of threaded support posts fixed beneath said seat support member to and supported on said upper channel member and movable therewith during fore and aft adjustment, said support posts being forwardly inclined relative to said seat support member, a jack nut member cooperatively associated with each of said support posts, power transfer means interconnecting each of said jack nut members and said seat support member, and drive means operatively associated with said jack nut members to cause rotation thereof upwardly and downwardly on said support posts to provide for upward and downward movement of said seat support member.

13. A seat adjuster unit comprising a seat support member having a flat upper surface, portions of said flat upper surface of said seat support member being angularly disposed relative to one another, a lower channel member fixably supported below said seat support member, an upper channel member slidably disposed on said lower channel member for fore and aft adjustment, said lower channel member and said upper channel member and said seat support member being aligned one above the other in a vertically stacked relationship, vertical seat adjustment means in the form of threaded support posts fixed beneath said seat support member to said upper channel member and movable therewith during fore and aft adjustment, said support posts being forwardly inclined relative to said seat support member, a jack nut member cooperatively associated with each of said support posts, one of said portions of said flat upper surface of said seat support member being disposed at right angles to the angle of inclination of said support posts, spring assist means seated on said upper channel member and abutting said one of said portions of said seat support member to bias the jack nut members upwardly on said support posts and create an upward force parallel to the longitudinal axes of said support posts, power transfer means interconnecting each of the jack nut members and said seat support member, and drive means operatively associated with the jack nut members to cause rotation thereof upwardly and downwardly on said support posts to provide for upward and downward movement of said seat support member.

14. A seat adjuster unit comprising a seat support member, a lower channel member fixably supported below said seat support member, an upper channel member slidably disposed on said lower channel member for fore and aft adjustment, said lower channel member and said upper channel member and said seat support member being aligned one above the the other in a vertically stacked relationship, vertical seat adjustment means in the form of threaded support posts fixed beneath said seat support member to said upper channel member and movable therewith during fore and aft adjustment, a jack nut member cooperatively associated with each of said support posts, power transfer means interconnecting each of the jack nut members and said seat support member, drive means operatively associated with the jack nut members to cause rotation thereof upwardly and downwardly on said support posts to provide for upward and downward movement of said seat support member, a horizontal adjustment drive housing fixed to said upper channel member, a worm and a worm gear supported within said drive housing, a central slot provided in said lower channel member, rack teeth provided along an edge of said slot, a pinion engageably supported with said rack teeth in said slot, and pinion driving means extending from said drive housing through said upper channel and drivingly associated with said pinion.

15. Seat adjuster mechanism comprising a support member for a seat, a trackway for horizontal adjustment of said seat, said trackway having a fixed member and a movable member mounted thereon for fore and aft adjustment, said fixed member and said movable member and said support member being aligned one above the other in a vertically stacked relationship, threaded support posts fixed to and supported on said movable member beneath said support member and movable therewith during fore and aft adjustment, nut members cooperatively associated with said support posts, link means interconnecting said nut members and said support member, and power means drivingly associated with said nut members for causing vertical movement thereof relative to said support posts to variably vertically position the seat.

References Cited in the file of this patent

UNITED STATES PATENTS

| | | |
|---|---|---|
| 2,839,124 | Desmond | June 17, 1958 |
| 2,886,094 | Pickles | May 12, 1959 |
| 2,939,513 | Leslie | June 7, 1960 |